TUNNEL DIODE NOT CIRCUITS

Filed Aug. 31, 1960 3 Sheets-Sheet 1

INVENTORS
KARL K. SMALLEY
WILLIAM G. STROHM
HANNON S. YOURKE

BY [signature]
ATTORNEY

Nov. 30, 1965 K. K. SMALLEY ETAL 3,221,179

TUNNEL DIODE NOT CIRCUITS

Filed Aug. 31, 1960 3 Sheets-Sheet 2

Nov. 30, 1965 K. K. SMALLEY ETAL 3,221,179

TUNNEL DIODE NOT CIRCUITS

Filed Aug. 31, 1960 3 Sheets-Sheet 3

United States Patent Office 3,221,179

Patented Nov. 30, 1965

3,221,179

TUNNEL DIODE NOT CIRCUITS

Karl K. Smalley, Ossining, William G. Strohm, Yorktown, Heights, and Hannon S. Yourke, Peekskill, N.Y., assignors to International Business Machines Corporation, New York, N.Y., a corporation of New York Filed Aug. 31, 1960, Ser. No. 53,088
6 Claims. (Cl. 307—88.5)

This invention relates to semiconductor switching circuits and more particularly to switching circuits employng Esaki tunnel diodes capable of providing large drives to a load and of performing a binary "NOT" logic function.

Two general categories of logic circuits employing Esaki tunnel diodes have been proposed. The first category employs a pair of tunnel diodes, popularly referred to the "Goto Twin," which is a voltage driven latch circuit and has been described in an article entitled "Esaki Diode High-Speed Logical Circuits," by E. Goto, et al., IRE Transactions on Electronic Computers, vol. EC–9, pp. 25–29, March 1960. This circuit consists of two series Esaki diodes driven at both ends of the series combination by clock pulses of opposite polarity. The use of clock pulses of different polarity guarantees that only one diode of the pair assumes a high voltage stable state. The input-output node connecting the two tunnel diodes is positive or negative depending upon the seeding from a preceding stage. Thus, majority type logic is performed by the summation of inputs.

The second category makes use of a current driven tunnel diode latch circuit such as described in an article entitled, "The Tunnel Diode as a Logic Element," by M. H. Lewin et al., appearing in the Digest of Technical Papers, 1960 Solid State Circuits Conference, pp. 10–11. Here, an Esaki diode is biased by a relatively high impedance source (usually clocked). Such biasing causes the Esaki diodes to exhibit two stable states of operation and provides significant D.C. current to load circuits only when operating in a high voltage state. The circuit switches to the high voltage state when the sum of the input currents and source current exceeds the peak current value of the Esaki diode and is employed to construct "AND" and "OR" summation logic circuits. These circuits, however, present severe tolerance requirements on the components, power supplies and clock sources.

In both categories discussed, the theoretical limit of current available to drive load circuits approaches the difference between the peak to valley currents of the Esaki diodes used. In practice it has been found that this limitation becomes a small fraction of this peak to valley difference. The drive requirements have been made small, but this has been accomplished only at the expense of extremely tight tolerances on the Esaki diode (including capacitance and D.C. characteristics in the high and low voltage regions). Such restrictions have been found to impose severe requirements on the regulation of the clocked voltage sources.

It has been found that with an Esaki diode biased to exhibit two stable states, such as that defined in the second category above, a circuit may be constructed to provide a large current to a load circuit which current is not limited by the peak to valley ratio of the Esaki diode. More specifically, a circuit is constructed in accordance to this invention wherein the clock pulses provide the necessary drive to switch load circuits. Such a circuit arrangement then achieves the highly sought after large fan-out factor, i.e., large number of outputs from a given circuit, each of which is capable of driving similar or other circuits. In addition to the above advantages, the circuit of this invention achieves the "NOT" logic function.

Accordingly, it is a prime object of this invention to provide an improved semiconductor switching circuit.

Another object of this invention is to provide a novel semiconductor switching circuit employing an Esaki diode capable of providing large current outputs not limited by the peak to valley ratio of the Esaki diode.

A further object of this invention is to provide an improved semiconductor binary switching circuit capable of manifesting the "NOT" logic function.

Still another object of this invention is to provide a novel and improved semiconductor switching circuit employing an Esaki diode to drive a plurality of circuits without imposing severe tolerances on the components therein.

The foregoing and other objects, features and advantages of the invention will be apparent from the following more particular description of preferred embodiments of the invention, as illustrated in the accompanying drawings.

Figure 1:
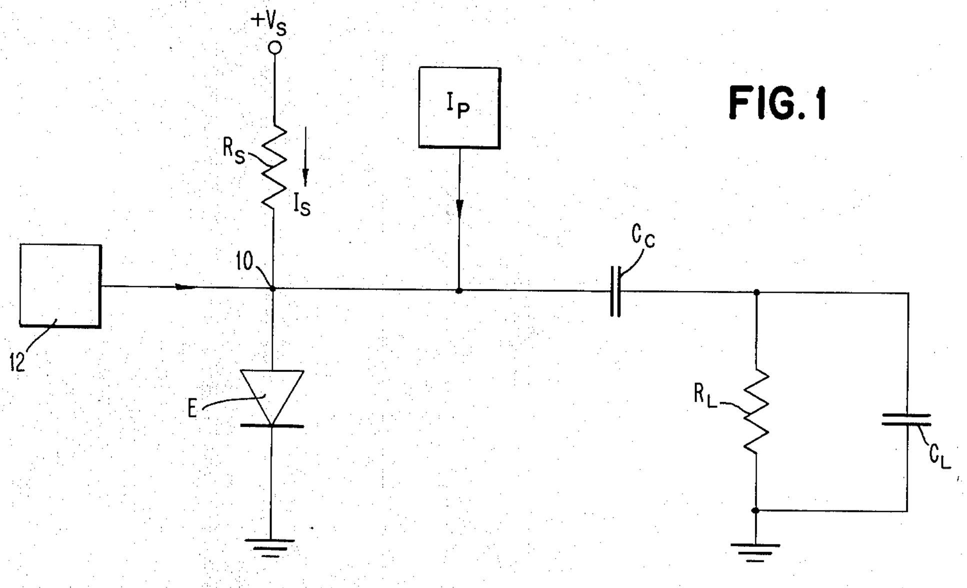
FIG. 1 is a schematic diagram of a basic embodiment of the invention.

Referring to FIG. 1, a basic embodiment of this invention is shown wherein an Easki diode E is connected between ground and a terminal 10. The terminal 10 is supplied an essentially constant current $I_s$ by means of a source of voltage $+V_s$ connected thereto through a large resistor $R_s$. The terminal 10 is further connected to a clock pulse source $I_p$ and signal input means 12. A load circuit comprising a parallel combination of a capacitor $C_L$ and a resistor $R_L$ is connected between ground and the terminal 10 through a series connected capacitor $C_c$.

Figure 2:
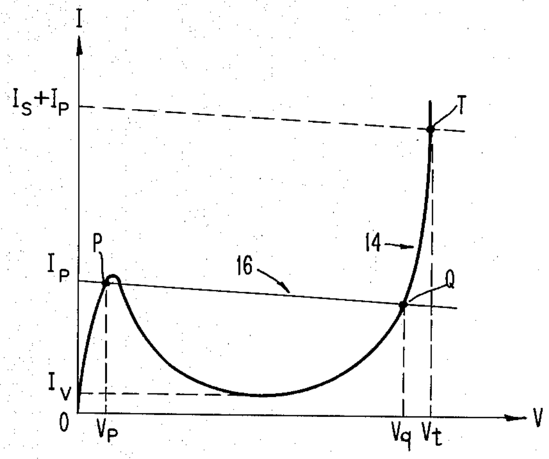
FIG. 2 is a plot illustrating a typical characteristic curve of an Esaki diode as employed in this invention.

Before explaining the operation of the circuit of FIG. 1, reference is now made to FIG. 2 which illustrates a plot of current (I) versus voltage (V) for the diode E in the circuit of FIG. 1. As shown, the diode E exhibits a characteristic curve 14 defining a first region of positive resistance over a low range of potentials and adjoining at a peak current value a second region of negative resistance and thence a third region of positive resistance. In the circuit of FIG. 1, the diode E is biased by the current $I_s$ and the load of $C_c$, $R_L$ and $C_L$. The diode E then sees a D.C. load which is an essentially open circuit load such as shown by load line 16 in the FIG. 2. The load line 16 intersects the curve 14 to provide a first stable operating state P at voltage $V_p$, and a second stable operating state Q at voltage $V_q$. Referring now to both FIGS. 1 and 2, the diode E is maintained in the stable state P until operation of the clock pulse source $I_P$ which directs a positive pulse to the terminal 10 causing the diode E to switch from the stable state P toward the stable state Q. With reference to FIG. 2, the diode E momentarily experiences a current of $I_s+I_p$ causing the diode E to switch to the unstable operating state T in the third region of its characteristic curve 12, defined by a voltage $V_t$. During the transition from states P to T, a charge is delivered to the capacitor $C_c$ and the load $R_L$, $C_L$ having a magnitude $C_c(Vt-V_p)$. The peak current available to provide this charge, assuming a small diode capacitance, approaches $I_s+I_p$ minus a current $I_v$ which is the valley current of the diode E as shown in FIG. 2.

After termination of the pulse from the source $I_p$, the diode E then assumes the stable state Q. If, prior to the application of the pulse from clock source $I_p$, the signal input means 12 is operative to energize the terminal 10, the circuit operates in the same manner to switch from the stable state P to the stable state Q. Assuming the clock pulse source $I_p$ is thereafter operative, only a small transition takes place in the diode E, namely a transition from state Q to state T. During the transition from state Q to state T, only a small charge having a magnitude $C_c(V_t-V_q)$ is delivered to the capacitors $C_c$, $C_L$ and resistor $R_L$. It may be seen, therefore, that the circuit performs inversion, in that a significant charge is delivered only when the signal input source 12 is not operative. The circuit of FIG. 1 is reset back to the stable state P when by operation of the clock pulse source $I_p$ supplies a negative pulse to the terminal 10 which overrides the source $I_s$ and negatively biases the diode E.

Figure 3:
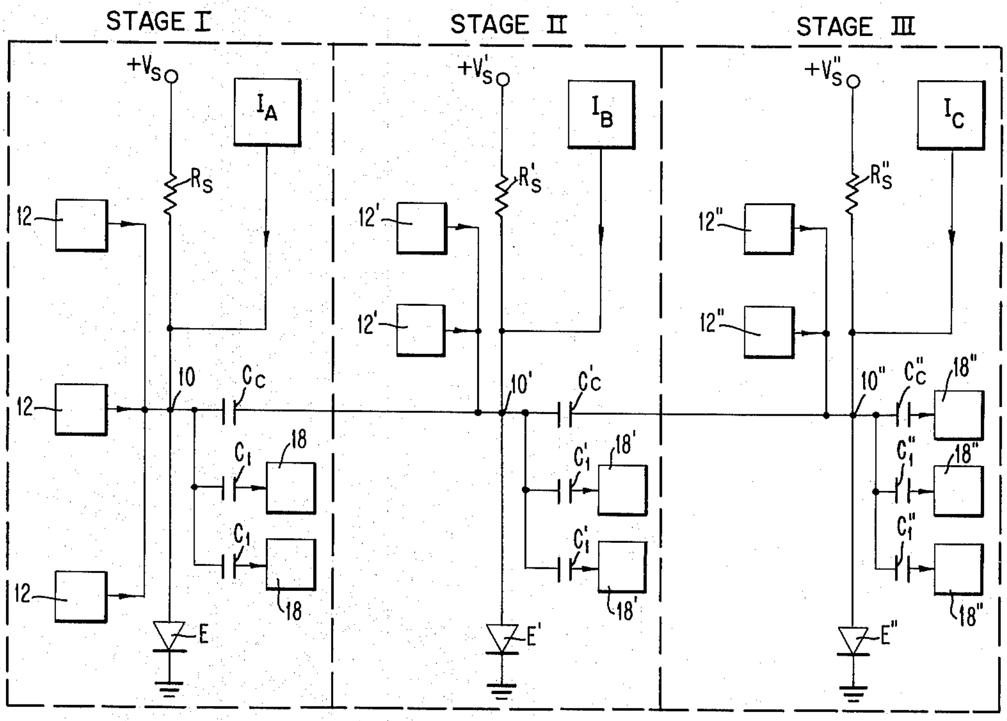
FIG. 3 is a schematic diagram of another embodiment of this invention.

Referring now to FIG. 3, three stages, stage I, stage II and stage III comprising the "NOT" circuits described above with reference to FIGS. 1 and 2 are shown interconnected to one another with the succeeding stages energized by a clock pulse source $I_A$, a clock pulse source $I_B$ and a clock pulse source $I_C$, respectively. Each terminal 10 of the various stages may have three inputs, one of which is shown connected to a preceeding stage while the others are shown as signal inputs 12, 12' and 12'', respectively. Each terminal 10 of the various stages may provide three outputs, one of which is shown connected to the succeeding stage of the circuit while others are shown energizing output loads 18, 18' and 18'' through capacitors $C_1$,$C^1{}_1$, and $C^{11}{}_1$ respectively.

Figure 4:
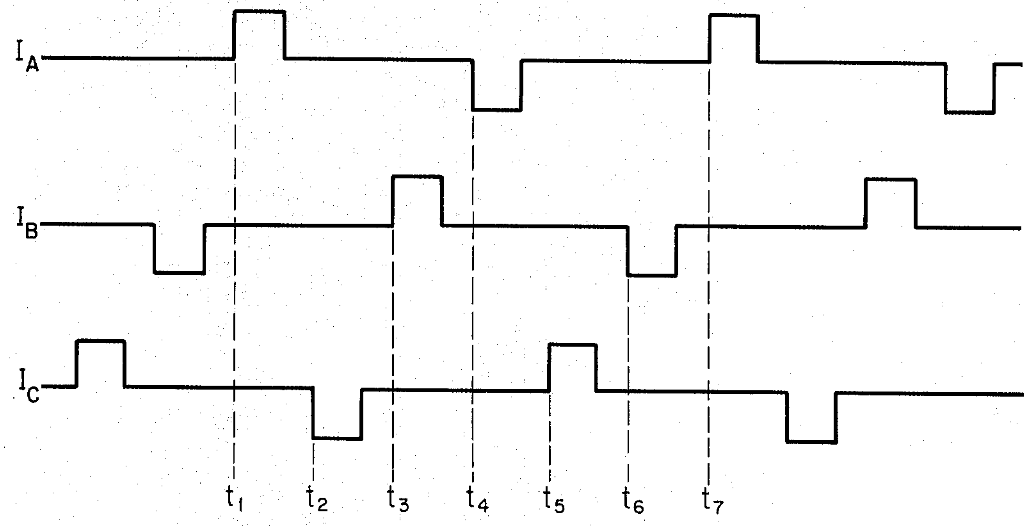
FIG. 4 is a plot of the various waveforms provided by clock pulse sources employed in the embodiment of FIG. 3.

The sequence of pulses provided by the various clock pulse sources, $I_A$, $I_B$ and $I_C$ is shown in FIG. 4 in various time intervals labelled $t_1$—$t_6$ are referred to in explaining the operation of the circuit of FIG. 3.

Referring to both FIGS. 3 and 4, assume, initially, each of the diodes of the stages I, II and III are operating in the stable state P. At the time $t_1$, the clock pulse source $I_A$ supplies a positive current pulse to the terminal 10 of stage I which causes the diode E' thereof to switch from stable state P to state T. During this transition, a current pulse is directed through the coupling capacitor $C_c$ of stage I to switch the diode E' of stage II from the stable state P to toward the state T. The operation of diode E' of stage II in switching follows its characteristic curve 14 shown in FIG. 2 to provide a maximum current $(I_s-I_v)$ to the diode E'' of stage III since the clock source $I_B$ is not operative and the only current available is that provided by the bias current $I_s$. Instantaneously, a current flows through the capacitor $C^1{}_c$ of stage II which theoretically should be sufficient to switch the diode E'' of stage III to the stable state Q. Whether or not diode E'' of stage III is switched to stable state Q at time $t_1$ it can be seen from the clock sequence shown in FIG. 4 that at time $t_2$ it will be reset back to stable state P. Further, it may be seen that after time $t_2$ the clock sequence of FIG. 4 is such that the data will not progress more than one stage at a time since the next succeeding stage will already be at stable state Q. Upon termination of the pulse at time $t_1$ from the source $I_A$, however, the diodes of stages I, II and III are left in the stable state Q. It should be noted that during operation of the source $I_A$ at time $t_1$, a plurality of outputs are available from the stage I since the power supplied is not dependent upon the current available from the diode E of that stage, i.e. the peak-to-valley ratio of the diode, but is supplied from the clock source $I_A$.

Diode E' of stage II has the same number of outputs connected to it but at time $t_1$ the only current available to drive these output stages is dependent upon the diode peak-to-valley ratio since no clock power is present at that time. While it is theoretically possible that this current might be sufficient to switch a diode E'' in stage III and other similar stages represented by loads 18' as mentioned previously, the clock sequence acts to prevent any errors from occurring since, as will be described subsequently, at time $t_2$ these stages are reset.

Upon termination of the pulse from source $I_A$ and at a time $t_2$, the clock pulse source $I_C$ supplies a negative pulse to the stage III which causes the operation of diode E'' to move toward the left on its characteristic curve 14 until the value $I_v$ is reached, at which time it jumps to a similar point in the first positive resistance region and then moves back to the stable state P upon termination of this pulse. While the negative pulse from $I_C$ at time $t_2$ is present, a voltage decrease will appear across the diode E'' of stage III which tends to pull current through the coupling capacitor $C'_c$ of stage II and the capacitor $C''_c$ of stage III. Since these stages both share the current required, it is easily seen, by a tolerance analysis, that resetting of diode E'' of stage III presents no problem with regard to resetting the adjacent diodes at this time. After termination of the pulse at time $t_2$ from source $I_C$, the clock pulse source $I_B$ at time $t_3$ supplies a positive pulse to the diode E' of stage II to cause the operation of diode E' thereof to move from its stable state Q to the state T in FIG. 2, thereby providing a small voltage change and thus little or no output signal. When this small voltage change occurs, it is desired that the diode E'' in stage III remain in its stable state P. In order to guarantee that the diode E'' of stage III remains in the stable state P at this time, an upper limit of the load line (stable state P), shown in FIG. 2, is provided.

After termination of the pulse at time $t_3$ from the source $I_B$, and at the time $t_4$, the clock pulse source $I_A$ operates to energize the stage I with a negative pulse which causes the operation of diode E thereof to move toward the left on its characteristic curve 14 until the value $I_v$ is reached, at which time it jumps to a similar point in the first positive resistance region and then moves back to the stable state P upon termination of the pulse.

As discussed previously, the change in voltage which occurs when the diode E resets to stable state P causes current flow through the capacitors $C_c$ of stage I and a similar capacitor in block 12 connected to it which tends to reset the stages immediately preceeding and succeeding the stage I. However, the change in voltage that occurs when the diode E of stage I is reset is not enough to cause the adjacent diode to reset. This can be shown by a tolerance analysis. Thereafter, at the time $t_5$, the $I_C$ clock pulse source energizes the stage III with a positive pulse which switches the diode E'' thereof from the stable state P to the state T and after termination of this pulse the diode relaxes to the stable state Q. During this transition, a large amount of current is available from the source $I_C$ to provide multiple output signals from this stage to loads 18'' through capacitors $C''_c$ and $C''_1$, illustrating a fan-out factor of three. Although only three outputs or inputs to any one stage is shown, a greater number could be employed since the power employed to provide multiple outputs is not dependent upon the gain of the Esaki diode but is achieved by use of the clock pulse.

After termination of the pulse from $I_C$, the diode E of stage I is in the stable state P and the diodes E' and E'' of stages II and III are in the stable state Q. At the time $t_6$, the $I_B$ clock pulse source energizes the terminal 10' of stage II with a negative pulse which resets the diode E' thereof from the stable state Q to the stable state P. Note, that back transfer is impossible since the stage I is already in the stable state P and any current thereto only serves to cause the diode E thereof to move to a lower point in its first positive resistance region. The clock system also insures that a positive pulse directed to any one stage propagates only to the next succeeding stage.

Assume, before operation of the source $I_A$ at the time $t_1$, a signal from one source 12 is directed to the terminal 10 of stage I. As explained above, the diode E of stage I is switched from the stable state P to the state Q. These input signals are present at a time (i.e. time $t_5$) when the $I_C$ is applied. At this time, the loads 18' in stage II are at stable state Q and will therefore not be switched. Immediately after the input signal is removed, the diode E' of stage II will be reset in order to prepare it to receive inputs from stage I at time $t_1$ (or time $t_1'$, etc.).

At time $t_1$, the $I_A$ clock pulse source supplies a positive impulse to the stage I which causes the operation of diode E thereof to move from stable state Q to state T. As described above, this has no effect and, therefore, there is no output provided from the stage I, providing the "NOT" function. Thereafter, at time $t_2$, the $I_C$ clock pulse source supplies a negative pulse to stage III. Since the diode E'' of stage III is in the stable state Q at the time $t_2$, it is reset to the stable state P as described above. After termination of the pulse at $t_2$ from $I_C$, the source $I_B$ supplies a positive pulse to the stage II at $t_3$ which causes the operation of diode E' thereof to move from stable state P to state T, providing a signal output to loads 18' and switches the diode E'' of stage III from stable state P to stable state Q. Thereafter, at time $t_4$, the $I_A$ clock pulse source delivers a negative pulse to stage I which resets the diode E thereof to the stable state P. At time $t_5$, the $I_C$ clock pulse source supplies a positive pulse to the stage III which has no effect other than to cause the operation of diode E'' thereof to move from the stable state Q to the state T. At the time $t_6$ in the cycle of operation, the source $I_B$ supplies a negative pulse to stage II which resets the diode E' thereof from the stable state Q to the stable state P.

Figure 5:
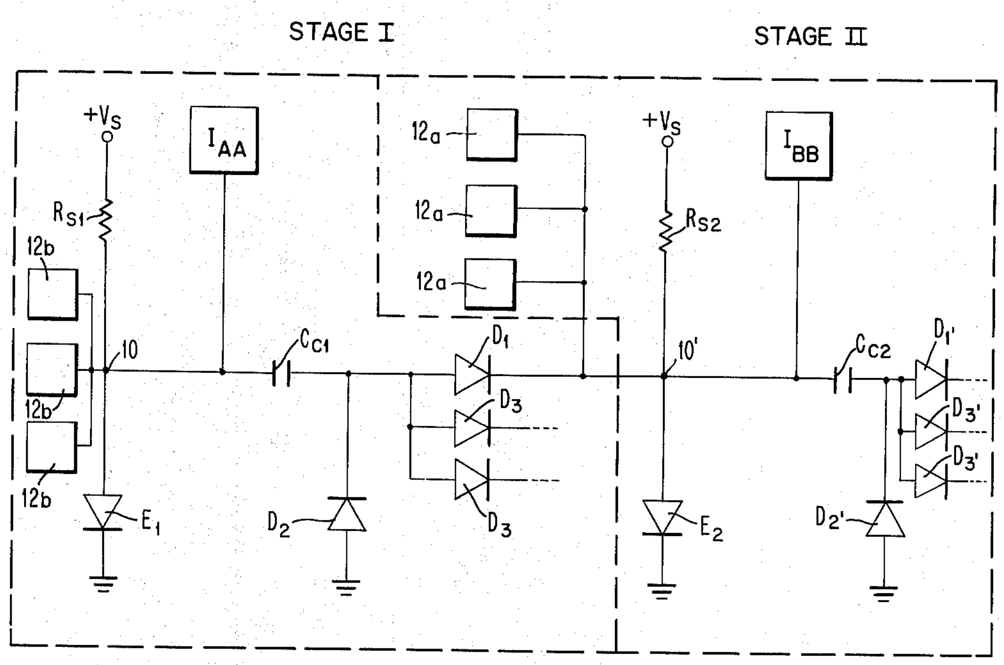
FIG. 5 is another embodiment of this invention.

Referring to the FIG. 5, another embodiment of this invention is shown wherein only a two-phase clock system is employed. Again a plurality of stages each comprising the basic circuit of FIG. 1 are coupled to one another by means of conventional diodes D. A conventional diode is one whose voltage-current characteristic exhibits no negative impedance when positively biased. Two stages of the circuit described above with reference to FIG. 1 are shown in FIG. 5, with the $R_L$, $C_L$ combination being replaced by an actual load on each stage. The capacitor $C_c$ of each stage is connected to the terminal 10 of the next succeeding stage through a diode $D_1$ and to ground through a diode $D_2$. The diode $D_3$ illustrates the fact that each stage is capable of driving a plurality of other stages, having a good fan-out factor, while the signal sources 12*a* and 12*b* illustrate the fact that outputs from other similar stages may be employed to drive the circuits of FIG. 5. The stage I of FIG. 5 is provided with a clock pulse source $I_{AA}$ while the stage II is provided with a clock pulse source $I_{BB}$.

Figure 6:
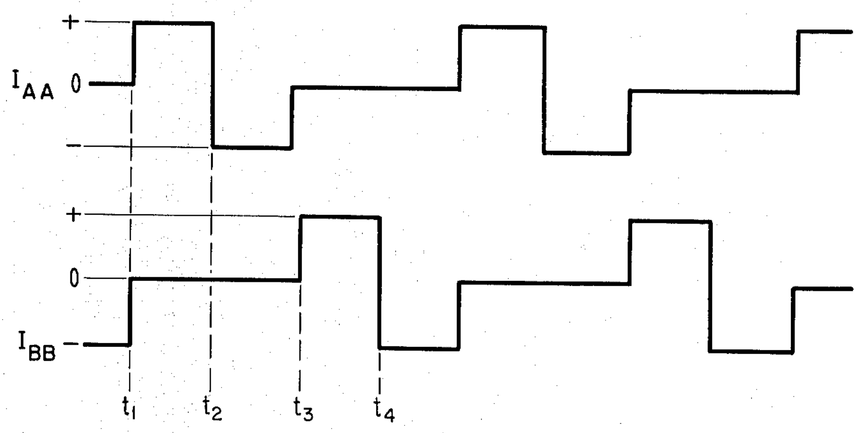
FIG. 6 is a plot of various waveforms employed by clock pulse sources in operating the embodiment of FIG. 5.

The sources $I_{AA}$ and $I_{BB}$ connected to the stages I and II respectively, in the circuit of FIG. 5 provide a series of impulses displaced in time as is shown in the FIG. 6. As an aid in describing the operation of the circuit of FIG. 6, the waveforms of the sources $I_{AA}$ and $I_{BB}$ as shown in FIG. 6 will be referred to in the detailed description to follow.

Referring to FIG. 5, assume that the diodes E of stages I and II are in the stable state P. At a time $t_1$, the clock source $I_{AA}$ supplies a positive current pulse to the terminal 10 of stage I causing the diode $E_1$ thereof to switch from the stable state P to the state T which causes current flow through the coupling capactor $C_{c1}$, through the diode $D_1$ and diode $E_2$ of stage II. The diode $E_2$ of stage II then switches from the stable state P to the stable state Q. The current flow in stage I due to the operation of the source $I_{AA}$ at this time provides output signals through the diodes $D_1$ and $D_3$, illustrating the fan-out connections from the stage I. Thus, with no signal input to the stage I, outputs are provided therefrom to provide the "NOT" logic. At a time $t_2$, the source $I_{AA}$ supplies a negative pulse to reset the diode $E_1$ of stage I back to the stable state P. Since diode $D_1$ is a high impedance to current flow due to the negative voltage change that occurs during the reset of diode $E_1$, diode $E_2$ of stage II is left in the stable state Q and the capacitor $C_{c1}$ is discharged through the diode $D_2$; the capacitor $C_{c1}$ receives its charge at a time $t_4$ when stage II is being reset, as is described subsequently. At time $t_3$, the clock source $I_{AA}$ turns off and the clock source $I_{BB}$ supplies a positive pulse to the terminal 10' of stage II which causes the diode $E_2$ thereof to swing from its stable state Q to state T on the curve 14 of FIG. 2. This operation results in a small voltage increase at terminal 10' of stage II but essentially no current flow through capacitor $C_{c2}$ due to the high impedance presented by the conventional diode $D_1'$. At time $t_4$, the diode E' of stage II is reset by the source $I_{BB}$ which supplies a negative pulse. At this time, current is drawn through the series path of diodes $D_2$ and $D_1$, towards the $I_{BB}$ source. A negative potential is developed on the right hand plate of $C_{c1}$ which, as stated above, is discharged when source $I_{AA}$ turns off.

In the interests of providing a complete disclosure, details of one embodiment of the circuit of FIG. 3 are given below. However, it is to be understood that other component values and current magnitudes may be employed with satisfactory operation attained so that the values given should not be construed as limiting.

With the source $+V_s$ of each stage in FIG. 3 delivering a constant voltage of +12 volts, the resistor $R_s$ may have a value of 13K ohms. The coupling capacitors $C_c$ and $C_1$ may have a value of 33 micro-microfarads with the diode E being a germanium diode having a peak current rating of one milliampere. Each of the clock sources $I_A$, $I_B$ and $I_C$ may deliver a peak current pulse of ±3.3 milliamperes.

While the invention has been particularly shown and described with reference to preferred embodiments thereof, it will be understood by those skilled in the art that various changes in form and details may be made therein without departing from the spirit and scope of the invention.

What is claimed is:

1. Apparatus for handling binary information comprising, a first, a second and a third stage each of which comprises a semiconductor switching element exhibiting a short circuit stable current-potential characteristic defining a first region of positive resistance and adjoining at a peak current value a region of negative resistance and adjoining a minimum valley current value a second region of positive resistance, an electrostatic storage device associated with said element, means for biasing said element to cause stable operation thereof in both said first and second positive resistance regions, circuit means connecting element of each stage to the element of the next succeeding stage through the associated electrostatic storage device, means for periodically and sequentially switching said elements alternately from one stable state to another, said means including a first, a second and a third clock pulse source adapted to deliver a sequence of pulses displaced in time and connected to said first, second and third stages, respectively, said first clock pulse source operable during a first time interval for switching the element of the first stage to stable operation in the second positive resistance region, said third clock pulse source operable during a second interval of time to establish and maintain the switching element of the third stage in stable operation in the first positive resistance region, said second clock pulse source operable during a third interval of time to switch the switching element of the second stage to stable operation in the second positive resistance region, said first clock pulse source operable during a fourth interval of time to switch the switching element of the first stage to stable operation in the first positive resistance region, said third clock pulse source operable during a fifth interval of time to switch the switching element of the third stage to stable operation in the second positive resistance region, and said second clock pulse source operable during a sixth interval of time to switch the switching element of the second stage to stable operation in the first positive resistance region.

2. Apparatus for transferring a binary bit of information comprising a first and a second cascaded stage; each said stage comprising a tunnel diode biased to operate in a first and a second stable state, a capacitor and a first and second asymmetrical impedance element; circuit means connecting the capacitor and first impedance element in parallel with the tunnel diode of each stage and further connecting the second impedance element of the first stage and the tunnel diode of the second stage in parallel with the first asymmetrical impedance element of the first stage; a first clock source connected to said first stage for switching the tunnel diode from the first stable state to the second stable state and then back to the first stable state, a second clock source connected to the second stage and operative subsequent to said first clock source for thereafter switching the tunnel diode of the second stage to the second stable state and back to the first stable state.

3. A circuit for transferring a binary bit of information comprising a plurality of cascaded stages; each said stage comprising a tunnel diode biased to operate in a first and a second stable state, an input terminal connected to one side of said tunnel diode, a capacitor and a first and a second asymmetrical impedance element, circuit means connecting said capacitor to said input terminal and said first asymmetrical impedance element and further connecting said capacitor to the input terminal of the next succeeding stage through the second asymmetrical impedance element; a first and a second clock source connected to different and alternate stages of said circuit for alternately switching the tunnel diodes of said stages from the first stable state to the second stable state, said second clock source being operative subsequent to said first clock source.

4. Apparatus for transferring a binary bit of information comprising a first, a second and a third cascaded stage; each said stage comprising, a tunnel diode biased to operate in a first low voltage stable state and a second high voltage stable state, a capacitor associated with said diode; circuit means connecting the diode of each stage to the diode of the next succeeding stage through the associated capacitor; a first, a second and a third clock pulse source adapted to deliver a sequence of pulses displaced in time and connected to said first, second and third stages, respectively; said first clock pulse source operable during a first time interval for switching the tunnel diode of the first stage to the second stable state; said third clock pulse source operable during a second interval of time to establish and maintain the tunnel diode of the third stage in the first stable state; said second clock pulse source operable during a third interval of time to switch the tunnel diode of the second stage to the second stable state; said first clock pulse source operable during a fourth interval of time to establish the tunnel diode of the first stage in the first stable state; said third clock pulse source operable during a fifth interval of time to switch the tunnel diode of the third stage to the second stable state; and said second clock pulse source operable during a sixth interval of time to establish the tunnel diode of the second stage in the first stable state.

5. A circuit arrangement comprising a semiconductor tunnel diode element exhibiting a current-potential characteristic defining a first region of positive resistance and adjoining at a peak current value a region of negative resistance and adjoining at a minimum valley current value a region of positive resistance, means for biasing said element for stable operation in both said first and said second positive resistance regions, load means capacitively coupled to said element, a pulse source for applying a first signal to said element substantially in excess of that required to switch said element from said first to said second positive resistance region whereby the current output provided to said load is in excess of the difference between said peak and said valley current values, and input means for applying a second signal to said element at least sufficient to switch said element from said first to said second positive resistance region, the operation of said pulse source and said input means being exclusive to the operation of said pulse source in applying a first signal to said element while in said second positive resistance region being operative to provide a minimal current output to said load means.

6. In a circuit comprising a semiconductor element exhibiting a short circuit stable current potential characteristic curve defining a first region of positive resistance over a low range of potentials and adjoining at a peak current value a region of negative resistance and thence a second region of positive resistance over a high range of potentials, load means capacitively coupled to said element, means for biasing said element for stable operation in both said first and said second positive resistance regions, a high energy source for switching said element from said first positive resistance region to said second positive resistance region so as to deliver a substantial charge to said load means, signal input means for switching said element to said second positive resistance region before operation of said source so as to minimize charge delivered to said load upon operation of said source, and means for resetting said element to said first positive resistance region.

References Cited by the Examiner

UNITED STATES PATENTS

| | | | |
|---|---|---|---|
| 2,649,502 | 8/1953 | Odell | 328—52 |
| 2,798,983 | 7/1957 | Warman | 328—52 |
| 2,944,164 | 7/1960 | Odell et al. | 307—88.5 |
| 2,964,637 | 12/1960 | Keizer | 307—88.5 |
| 2,975,377 | 3/1961 | Price et al. | 307—88.5 |
| 2,986,724 | 5/1961 | Jaeger | 307—88.5 |
| 3,034,106 | 5/1962 | Grinich | 307—88.5 |
| 3,039,082 | 6/1962 | Spencer | 307—88.5 |
| 3,056,048 | 9/1962 | McGrogan | 307—88.5 |
| 3,062,971 | 11/1962 | Wallace | 307—88.5 |
| 3,072,804 | 1/1963 | Aaronson | 307—88.5 |
| 3,089,961 | 5/1963 | Overn et al. | 307—88.5 |

FOREIGN PATENTS

| | | |
|---|---|---|
| 596,131 | 4/1960 | Canada. |

JOHN W. HUCKERT, *Primary Examiner.*